(12) United States Patent
Willey et al.

(10) Patent No.: US 8,577,396 B2
(45) Date of Patent: *Nov. 5, 2013

(54) APPARATUS, AND ASSOCIATED METHOD, FOR PAGING AN ACCESS TERMINAL IN A RADIO COMMUNICATION SYSTEM USING OPTIMAL DECORRELATE VALUES

(75) Inventors: William Daniel Willey, Gilroy, CA (US); Muhammad Khaledul Islam, Ottawa (CA)

(73) Assignee: BlackBerry Limited, Waterloo (CA)

( * ) Notice: Subject to any disclaimer, the term of this patent is extended or adjusted under 35 U.S.C. 154(b) by 1623 days.

This patent is subject to a terminal disclaimer.

(21) Appl. No.: 12/024,236

(22) Filed: Feb. 1, 2008

(65) Prior Publication Data

US 2008/0188248 A1     Aug. 7, 2008

Related U.S. Application Data

(60) Provisional application No. 60/887,757, filed on Feb. 1, 2007.

(51) Int. Cl.
    *G06F 11/30*         (2006.01)

(52) U.S. Cl.
    USPC .......................................... 455/458; 370/458

(58) Field of Classification Search
    USPC ....................................................... 455/458
    See application file for complete search history.

(56) References Cited

U.S. PATENT DOCUMENTS

| | | | |
|---|---|---|---|
| 6,687,285 B1* | 2/2004 | Jou ................................ | 375/133 |
| 6,754,229 B1* | 6/2004 | Islam et al. .................... | 370/468 |
| 7,606,601 B2* | 10/2009 | An et al. ........................ | 455/574 |
| 8,065,530 B2* | 11/2011 | Willey et al. .................. | 713/187 |
| 2005/0064880 A1 | 3/2005 | Butler et al. | |
| 2005/0186973 A1* | 8/2005 | Gaal et al. ..................... | 455/458 |
| 2006/0098718 A1* | 5/2006 | Sarkar et al. .................. | 375/147 |
| 2006/0148493 A1* | 7/2006 | Narasimha et al. ........... | 455/458 |
| 2010/0210321 A1* | 8/2010 | Tu et al. ........................ | 455/574 |
| 2011/0306315 A1* | 12/2011 | Subrahmanya et al. ... | 455/226.1 |

OTHER PUBLICATIONS

The 3GPP2 specification C.S0024-B v1.0, "cdma2000 High Rate Packet Data Air Interface Specification", Published May 2006.*

* cited by examiner

*Primary Examiner* — Marcos Batista
*Assistant Examiner* — Frank Donado

(57) ABSTRACT

The present invention relates generally to a manner by which to page an access terminal of a radio communication system to alert the access terminal of a pending call, or other communication. More particularly, the present invention relates to apparatus, and an associated method, that provides for the generation, sending, and analysis of a quick page message upon a paging channel, such as a QPCH (quick paging channel) defined in an exemplary cellular communication system. The page message is formed in a manner that reduces the likelihood of occurrence of false wakeup of an access terminal. Excessive battery depletion, as a result of false wakeup of the access terminal, is avoided.

14 Claims, 10 Drawing Sheets

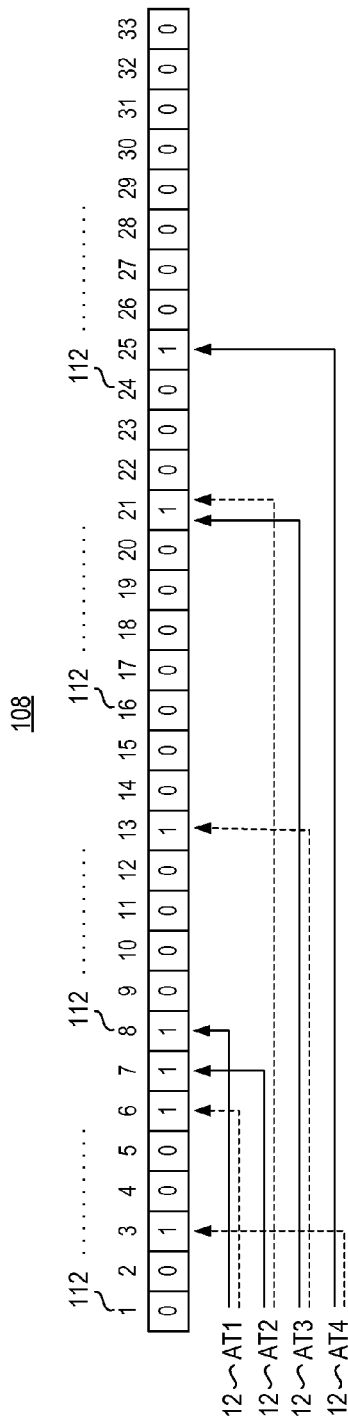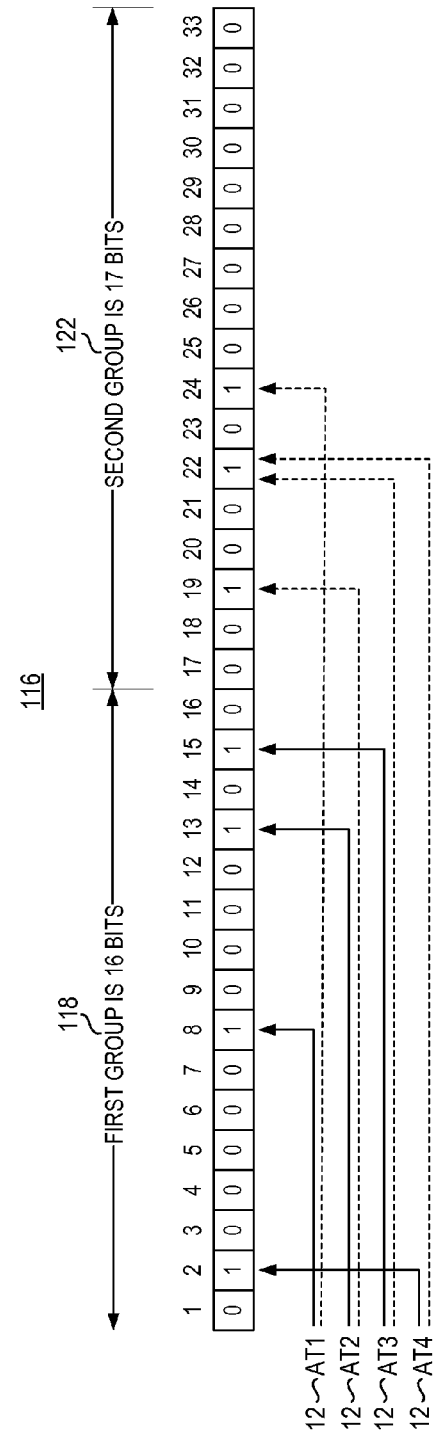

APPARATUS, AND ASSOCIATED METHOD, FOR PAGING AN ACCESS TERMINAL IN A RADIO COMMUNICATION SYSTEM USING OPTIMAL DECORRELATE VALUES

CROSS REFERENCE TO RELATED APPLICATIONS

The present application claims the priority of U.S. provisional patent application Ser. No. 60/887,757, filed on Feb. 1, 2007, the contents of which are incorporated herein by reference.

The present invention relates generally to a manner by which to page an access terminal of a radio communication system to alert the access terminal of a pending call, or other communication. More particularly, the present invention relates to apparatus, and an associated method, that provides for the generation, sending, and analysis of a quick page message upon a paging channel, such as a QPCH (quick paging channel) defined in an exemplary cellular communication system. The page message is formed in a manner that reduces the likelihood of occurrence of false wakeup of an access terminal. Excessive battery depletion, as a result of false wakeup of the access terminal, is avoided.

BACKGROUND OF THE INVENTION

Advancements in communication technologies have permitted the development and deployment of new types of communication systems and communication services. Cellular telephony, and associated communication services available therethrough, are popularly utilized by many, typically providing users with communication mobility and also provides the capability of communications when the use of wireline communication systems would not be practical or possible.

While early-generation, cellular communication systems provided primarily for voice communications and only limited data communication services, newer-generation systems increasingly provide for high-speed data communication services at variable data communication rates. A CDMA2000, cellular communication system that provides for EV-DO services is an exemplary type of new-generation, cellular communication system that provides for high-speed data services. Operational details and protocols defining communications and operational requirements of devices of the system are set forth in an operating standard specification. Various aspects of operation of the CDMA2000 EV-DO communication scheme remain to be standardized and certain parts of the existing standard specification are considered for amendment. Various successor-generation communication schemes are also undergoing standardization and yet others are envisioned to be standardized.

For instance, a revision to the standard specification, release B of the CDMA2000 EV-DO specification standard that defines a quick paging channel (QPCH) available upon which to broadcast access-terminal pages by an access network (AN) to an access terminal (AT). The QPCH was adopted in industry contributions 3GPP2 C20-20060323-013R1 and 3GPP2 C20-20060323-003R1 and published in 3GPP2 document C.S0024-B V10. Generally, pages are broadcast by the access network to an access terminal to alert the access terminal of a pending communication. And by so alerting the access terminal, the access terminal performs actions to permit the effectuation of the communication. Page indications broadcast upon the quick paging channel are broadcast in a manner that facilitates reduced battery consumption of the access terminal. Increased battery longevity is provided, reducing the rate at which a battery of the access terminal must be recharged. The access terminal is, as a result, able to be operated for a greater period of time between rechargings or battery replacement. The aforementioned promulgations provide for broadcast of a message including page indications upon a physical logical layer that is monitored by the access terminal. The access terminal monitors the QPCH prior to monitoring the control channel to receive regular, control channel MAC (medium access control) messages such as page messages. A quick page message is broadcast upon the QPCH that contains quick page indicators. The quick page message includes a number of quick page indicator slots populated with quick page indicators.

During operation, a mobile station hashes to a quick page indicator location, i.e., slot, within the quick page message based upon a session seed, e.g., a 32-bit pseudorandom number. If the quick page indicator of the quick page indicator slot to which the access terminal hashes indicates that the access terminal is not being paged, the access terminal enters into a sleep state, a reduced-power state, in which the access terminal does not remain powered at a level to receive the regular control channel MAC messages. Power savings is particularly significant in the event that the control channel MAC messages are lengthy and span multiple control channel frames or capsules.

In the existing scheme, however, the access terminal is susceptible to the occurrence of a false wakeup, that is, the access terminal does not enter into a sleep state but, rather, the access terminal enters into an active state to monitor the regular control channel for reception of regular control channel MAC messages even though there are no message for the access terminal. Because the communication system is a multi-user system, there is a possibility that another access terminal that is being paged has its page indication hashed to the same page indication slot. As the number of access terminals that are paged in a system increases, the likelihood of occurrence of a false wakeup correspondingly increases. Additionally, proposals have been set forth to utilize a fixed number of quick paging indicators per page. A fixed number of three and a fixed number of four, for example, have been proposed. However, depending upon the transmission format that is utilized, use of the fixed number of four paging indicators per page might well not give an acceptably low false page response rate to allow page response based solely upon the quick page message.

If a manner could be provided by which to reduce the occurrence of false wakeups, particularly when a fixed number of paging indicators are used, improved battery longevity of the access terminal would be possible.

It is in light of this background information related to paging by an access network of an access terminal that the significant improvements of the present invention have evolved.

BRIEF DESCRIPTION OF THE DRAWINGS

FIG. 3 illustrates an exemplary quick page message generated pursuant to operation of an exemplary embodiment of the present invention.

FIG. 4 illustrates an exemplary quick page message generated pursuant to operation of another exemplary embodiment of the present invention.

FIG. 7 illustrates an example of the above procedure being used to select paging indicators for an AT, AT1.

FIG. 8 illustrates another example of the above procedure being used to select paging indicators for an AT, AT2.

DETAILED DESCRIPTION

Figure 1:
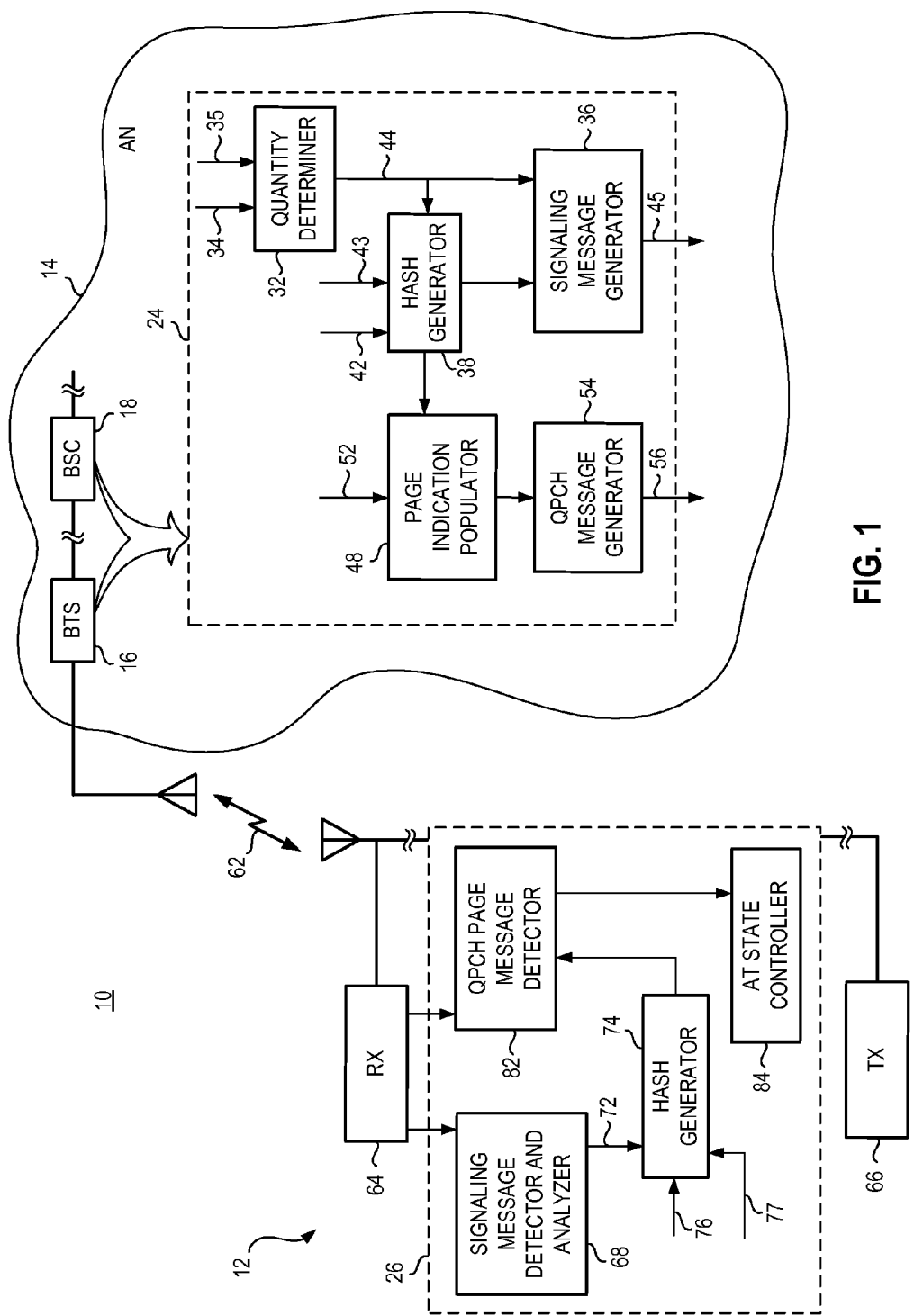
FIG. 1 illustrates a functional block diagram of a radio communication system in which an embodiment of the present invention is operable.

The present invention, accordingly, advantageously provides apparatus, and an associated method, by which to page an access terminal of a radio communication system to alert the access terminal of a pending call, or other communication.

Through operation of an embodiment of the present invention, a manner is provided to generate, send, and analyze a quick page message, such as a quick page message generated and sent upon a QPCH (Quick Paging Channel) defined in a CDMA2000 EV-DO cellular communication system.

The page message is formed in a manner such that, when analyzed, the access terminal is less susceptible to occurrence of a false wakeup. By reducing the likelihood of occurrence of false wakeup, excessive battery depletion that occurs as a result of false wakeup is less likely to occur.

Through operation of another embodiment of the present invention, a manner is provided by which to utilize a fixed number of three paging indicators per page and, while providing page responses based solely on a Quick Page message, for a 128-bit transmission format, at an acceptably low false page response rate.

Through further operation of an embodiment of the present invention, a manner is provided by which to utilize a fixed number of three paging indicators per page and, while providing page responses based solely upon a Quick Page message, for a 256-transmission format, at an acceptably low false page response rate.

In one aspect of the present invention, hashing is performed at both an access network and at an access terminal using the same input number, such as a session seed defined in the CDMA2000 EV-DO operating specification standard or other pseudorandom number, or another input number, such as an access terminal identifier (ATI). Hashing is performed upon the input number in the same manner, independently, at the access network and at the access terminal. Multiple hashes are formed by hashing the input number in different manners, e.g., such as by rotating the bit sequence of the input number to create different hash values. Alternately, different hash functions are used to create the different hashes. Formation of the multiple hashes is sometimes referred to herein as multi-hashing. Each hash function operation is carried out in the same manner at the access network and at the access terminal so that the resultant hash values generated at the respective entities are identical. For instance, hashing is first performed at both the access network and at the access terminal upon the input number in non-rotated form. Then, the hashing is performed, again at both the access network and at the access terminal, upon the input number whose bits are rotated by a first number of bits. If additional hashing is performed, the access network and the access terminal both perform the hashing upon the input number, whose bits are further rotated, again in the same manner at the access network and at the access terminal. Bit rotation also decorrelates the hashed values.

In a further aspect of the present invention, the hashing is performed upon the input number by operation of a hash function, or algorithm, upon the input number. The hash function, e.g., is time-varying or otherwise, in some manner, generates hash values that are time-dependent. And, if desired, if multiple hash values are generated, the hash values are further caused to be dissimilar. That is to say, when multiple hash values are generated, a later-generated hash value is caused to be of a value different than any earlier-generated hash value.

In another aspect of the present invention, the access network identifies the number of hashes and the number of page indications that are to be included in a quick page message to page a particular access terminal. A signaling message is generated that includes an indication of the number of hashes or page indications that are going to be broadcast by the access network to a particular access terminal within a paging message. The access terminal, from this signaling message, ascertains the number of page indications that are going to be directed to the access terminal in the quick page message. Responsive to this received number, the access terminal performs hashing upon an input number to form an appropriate number of hash values, and such hash values are used pursuant to analysis of the page message, when received, to identify where in the page message to detect values of page indicators.

In another aspect of the present invention, the number of hashes performed by the access network and, correspondingly, the number of hashes performed at the access terminal, is a selectable number. The number is selected, at least in part, based upon the number of pages that are to be made to other access terminals. And, more generally, the number of hashes is responsive to communication activity in the communication system. When many access terminals are paged, the number of page indications, and hash values, per access terminal is, e.g., a small value. And, conversely, when only a small number of access terminals are to be paged, the number of page indications, and hash values, is, e.g., large. Generally, the number of hash values and resultant page indications per access terminal, populated into a page message for a particular access terminal, is inversely proportional to the communication activity, that is, the number of other pages that are made to other access terminals during a particular period of operation of the communication system. Ideally, the number of page indications and hash values per access terminal is chosen in a way to minimize the probability of false wakeup.

In another aspect of the present invention, the hash values determine where in the page message that the page indications are populated. The hashings performed at the access network and at the access terminal are carried out in the same manners. The page indication locations of a page message in which the page indication values are populated are the same hash values that are generated at the access terminal, and the access terminal detects and analyzes the corresponding page indication locations of the page message, once received at the access terminal.

In another aspect of the present invention, in the event that any of the values of the page indications populating the page indication locations corresponding to the hash values indicate that the access terminal is not being paged, the access terminal enters into a sleep state. For instance, if the access terminal detects any page indication value to which the access terminal hashes and determines the access terminal is not being paged, the access terminal enters into a sleep state. Thereby, the access terminal is more quickly able to enter into a power-saving, sleep mode. Conversely, if the access terminal identifies a page indication value populating a page indication location that indicates that the access terminal is being paged and the access terminal knows that multiple page indications are broadcast to the access terminal in the quick page message, the access terminal monitors for the same page indication value in another page indication location to which the access terminal hashes. If the first positive indication is a false indication, monitoring of a second, or other, page indication locations prior to determining finally that the access terminal is being paged reduces the likelihood of occurrence of false wakeup. Thereby, the access terminal does not enter into an active state to receive a communication responsive to a false wakeup indication. Improved power consumption characteristics of the access terminal result, providing better battery longevity.

In another aspect of the present invention, a hash generator, and an associated hash generation mechanism or hash generation algorithm is provided. The hash values generated by the hash generator ensure, or significantly reduce the possibility, that the hash values, used to hash to locations in a page message for paging of different access terminals, shall be the same value. The occurrence of hash-value "collision" is thereby reduced or eliminated.

In these and other aspects, therefore, apparatus, and an associated methodology, is provided for an access network that selectably generates a first page message on a first paging channel. A page indication populator is configured to populate the first page with a selected number of page indications. A hasher is configured to generate a selected number of hash values. Each hash value is determinative of where the page indicator populates the first page message with a page indication. The hash values selected by the hasher reduce, or eliminate, the possibility of multiple populations of the same location of the page message with multiple hash values.

In these and other aspects, therefore, further apparatus, and an associated methodology, is provided for an access terminal that selectably receives a first page message on a first paging channel. A hasher is configured to generate a selected number of hash values. And, a page indication detector is configured to detect values of page indications populating the first page message. Hash values that are generated are used to identify to the page indication detector where in the first page message to detect the values of the page indications.

Referring first, therefore, to FIG. 1, a radio communication system, shown generally at 10, provides for communications with access terminals, of which the access terminal 12 is exemplary. The communication system forms a multi-user communication system that typically includes a large number of access terminals and a plurality of concurrent communication dialogs. While only a single access terminal is shown in FIG. 1, additional access terminals, analogous to the access terminal 12, typically form a portion of the communication system.

Communications are effectuated between an access terminal and a radio network 14, formed of fixed network infrastructure elements, such as a base transceiver station (BTS) 16 and a base station controller (BSC) 18. The access network encompasses a geographical area within which communications with the access network are possible. That is to say, when an access terminal is positioned within the area encompassed by the access network, the access terminal is generally able to communicate with the access network, and the access network is typically able to communicate with the access terminal.

The communication system is operable in general conformity with the operating protocols and parameters of an appropriate communication specification standard. The description set forth herein is exemplary, and the teachings of various embodiments of the present invention are implementable in any of various types of communication systems.

As previously mentioned, the access terminal is alerted, by broadcast of page messages when a communication, initiated at the network, is to be terminated at the access terminal. A quick paging channel (QPCH), or analogous channel, is defined. Quick page indications, populating a quick page message, are of values that identify whether an access terminal is being paged. However, also as noted previously, particularly during times of heavy usage, a false wakeup of the access terminal might occur due to a quick page indication in the message intended for one access terminal is broadcast within a slot that is also used by another of the access terminals. False wakeup prevents an access terminal from entering into a power-saving sleep mode.

Accordingly, pursuant to an embodiment of the present invention, the access network includes apparatus 24, and the access terminal includes apparatus 26, that operate to reduce the likelihood of the occurrence of false wakeup. The elements of the apparatus 24 and the apparatus 26 are functionally represented, implementable in any desired manner, including, for instance, by algorithms executable by processing circuitry.

The elements forming the apparatus 24 are implemented at any appropriate location of the access network 14, including, as illustrated, at the BTS 16 and BSC 18 or distributed amongst such entities as well as others.

Here, the apparatus 24 includes a quantity of hashes/page indications per access terminal determiner 32. The determiner is coupled to receive, as input indicia, indications of network activity on the lines 34 and 35. The network activity is quantified, for instance, in a number of page values. The network is aware, e.g., of the number of access terminals that shall be paged. Or, the number of page values comprises, e.g., an expected number of pages, an average number of prior pages, or other paging quantity indicia. Responsive to the indication of the network activity, the determiner 32 determines the number of hashes that are to be generated and the number of page indications that are to be provided pursuant to paging of an access terminal in a quick paging message. In an alternate implementation, the number of hash values is a set number, e.g., a fixed number greater than one. The fixed number of two, e.g., appears to work well when the number of page indication locations in a quick page message is about one hundred eighty. The number of hash values and number of page indications correspond. An indication of the determined quantity is provided to a signaling message generator 36 and to a hash generator, a "hasher," 38.

A number known to both the access network and to the access terminal, such as a session seed or other pseudorandom number, or a number such as an access terminal identifier (ATI) is provided to the hash generator 38, here represented by way of the line 42. The hash generator hashes the number. That is to say, a hash function is performed upon the number to generate a hash value. Different hash values are provided by, e.g., rotating the number provided to the hash generator and performing the hash function, or algorithm, thereon. Multiple hash values are generated, for instance, by operating upon multiple rotations of the number. With an ideal hash function, all values are equally likely to be generated. An exemplary hash function comprises a mathematical "modulo" operation. A time factor, known to both the access network and the access terminal, such as a system clock time, is, in one embodiment, further provided to, and used by, the hash generator in the formation of hash values. Such factor is represented by line 43 in FIG. 1.

In a further embodiment of the present invention, the hash function forms a hash mechanism that reduces, or eliminates, the possibility that the same hash value shall be selected as a result of multiple hashings. That is to say, in the further embodiment, unique numbers are generated, reducing the amount of "collisions" with, or of, access terminals that are not being paged.

For example, the hash function comprises a so-called Algorithm S (selection sampling technique) taken from Kruth's "The Art of Computer Programming", 3d Edition, Chapter 3.4.2.

In another implementation, a generate Unique List PI Bits_A algorithm is used in which:
  MBA=maximum number of bits available to be set
  nPI=number of PI bit locations to select
  iPI=number of PI bit locations found so far
  jPI=index running through iPI selections
  rnd=new random bit to be set. If this is the (jPI+1)st location we need to add jPI to it, since jPI locations are already taken
  uListPI[1 ... nPI]=sorted list of unique indexes of nPI bits to select within MBA;

The algorithm is, e.g., comprises of this pseudo code:

```
generateUniqueListPIBits_A( MBA, nPI ) returning uListPI[ ]
{
    Verify arguments and make sure enough bits are available to be set;
    Select a random across all bits and assign it to the first item in the
    list, e.g.
    uListPI[1] = random(1, MBA);
    Now one by one select random bits from remaining bits, e.g.
    foreach ( iPI = 1→ nPI-1)
    {
        Let rnd = random(1, MBA – iPI), since iPI bits are not available
        Insert the new rnd location (from among available bits) to
        uListPI, e.g.
        foreach ( jPI = iPI → 1)
        {
            Shift indexes in uListPI to insert rnd, so uListPI remains
            sorted e.g. if ((rnd + jPI) > uListPI [jPI]) found
            location so break from loop;
            else uListPI [ jPI + 1] = uListPI [ jPI ];
        }
        uListPI [ jPI + 1 ] = rnd + jPI; Note jPI=0 if the loop exited
        without break
    }
    Return uListPI[ ];
}
```

In another implementation, a generate Simple Almost Unique List PI Bits D algorithm is used in which:
  MBA=maximum number of bits available to be set
  nPI=number of PI bit locations to select
  iPI=number of PI bit locations found so far
  jPI=index running through iPI selections
  rnd=new random bit to be set.
  auListPI[1 ... nPI]=list of almost unique indexes of nPI bits to select within MBA;

The algorithm is, e.g., comprised of this pseudo code:

```
generateSimpleAlmostUniqueListPIBits_D( MBA, nPI )
returning auListPI[ ]
{
    Verify arguments and make sure enough bits are available to be set;
    Select a random across all bits and assign it to the first item
    in the list, e.g. auListPI [1] = random(1, MBA);
    Now one by one select random bits from remaining bits, e.g.
    foreach ( iPI = 1→ nPI -1)
    {
        Let rnd = random(1, MBA – iPI), since iPI bits are not available
        Increment rnd by 1 for each smaller index found so far, e.g.
        foreach ( jPI = 1 → iPI)
        {
            if ((rnd) > auListPI [jPI]) rnd++;
        }
        auListPI [ iPI + 1 ] = rnd;
    }
    Return auListPI[ ];
}
```

In another implementation, a generate Simple Almost Unique List PI Bits K algorithm is used in which:
  MBA=maximum number of bits available to be set
  nPI=number of PI bit locations to select
  jPI=index running through iPI selections
  rnd=new random bit to be set.
  auListPI[1 ... nPI]=list of almost unique indexes of nPI bits to select within MBA;
  vBitsSet[1 ... MBA]=boolean local vector representing bits set so far The algorithm is, e.g., comprised of the pseudo code:

```
generateSimpleAlmostUniqueListPIBits_K(MBA, nPI) returning
auListPI[ ]
{
    Verify arguments and make sure enough bits are available to be set;
    Set vBitsSet[ ] vector to false;
    Now one by one select random bits checking for single
    collisions, e.g.
    foreach ( jPI = 1→ nPI)
    {
        Select a new random number, e.g.
        Let rnd = random(1, MBA);
        Do a simple single rehash in case of collision, e.g.
        if (vBitsSet[rnd]) rnd = ((rnd+MBA/nPI) mod MBA);
        vBitsSet[rnd] = TRUE;
        auListPI[jPI] = rnd;
    }
    Return auListPI[ ];
}
```

The random number generation mentioned in the above, exemplary pseudo codes uses, e.g., existing methods with different keys and/or DECORR values.

The signaling message generator 36 to which the value determined by the determiner 32 is provided generates a signaling message, here generated upon the line 45, that identifies the quantity determined by the determiner. The signaling message is broadcast to the access terminal 12, thereby to alert the access terminal of the determined quantity. The signaling message generator 36 may operate in conjunction with the QPCH generator 54 and include the quantity in the QPCH message. The hash values created by the hash generator 38 are provided to a page indication populator 48. The page indication populator 48 is also provided with a network communication request, here provided by way of the line 52. The page indication populator 48 selects page indication values depending upon whether the access terminal is to be paged. For instance, when an access terminal is to be paged, the page indication values are logical "1" values. In one implementation, all values are initially logical "0" values and then set as appropriate. The page indication values and their associated page indication locations, defined by the hash values generated by the hash generator 38, are provided to a QPCH, or other, message generator 54. The message generator 54 forms a page message that includes a plurality of page indication locations. The page indication populator 48 populates selected page indication locations of the message with the page indication values. The locations populated with a page indication value are determined by the hash values generated by the hash generator 38. In like manner, page indications are formed for other access terminals and hash values are generated to define at where in the page message the page indications intended for other access terminals are populated in the message generated by the message generator 54. When the resultant message is broadcast by the access network, access terminals, such as the access terminal 12, are provided with an indication of whether the access terminal is to be paged.

Transceiver elements of the base transceiver station 16 cause broadcast of the messages generated by the message generator 54 of the apparatus 24 upon a radio air interface, represented in FIG. 1 by the arrow 62. The message is delivered to the access terminal 12 as well as other access terminals within reception range of the broadcast message. The access terminal 12 includes transceiver circuitry, here represented by a receive part 64 and a transmit part 66. The receive part 64 operates to receive signals sent thereto, such as the messages generated by the apparatus 24 of the access network. And, certain of the detected signals are provided to the apparatus 26. Of significance here are detections of the signaling message generated by the signaling message generator 36 of the access network 14 and of the page message 56 generated by the message generator 54.

Indications are provided to a signaling message detector and analyzer 68. The detector and analyzer 68 operate to detect the contents of the signaling message and analyze the detected message to ascertain the number of hashes, or page indications, per access terminal indicated in the message. Indications are provided, here by way of the line 72, to a hash generator 74. The hash generator 74 is also provided with values of the input number, here indicated to be provided by way of the line 76, known to both the access network and access terminal. The time factor, known to both the access network and access terminal is also provided to the generator 74, here represented by way of line 77. The hash generator 74 operates in manners analogous to operation of the hash generator 38 of the access network to perform hash functions upon the input number. And, the input number provided to the hash generator 74 corresponds to the input number provided to the hash generator 38 on the line 42. The number of hash values generated by the hash generator 74 corresponds to the number identified by the detector and analyzer 68. Hash values created by the hash generator 74 are provided to a QPCH (Quick Paging Channel), or other, page message detector 82. The hash values created by the hash generator 74 identify to the page message detector 82 which of the page indication locations that should be monitored to determine whether a page is broadcast to the access terminal. The message broadcast by the access network 14 and detected and operated upon by the access terminal 12 is an atomic message. That is to say, all of the bits are received in a single message. Responsive to detections made by the detector, an indication is provided to an access terminal (AT) state controller 84 to control the state into which the access terminal is placed. And, when the QPCH message indicates that the access terminal is paged, the access terminal begins to monitor a second page channel, for broadcast of a second page message thereon. The receive part of the access terminal also monitors the second page channel. The page indications in the message generated by the message generator 54 are therefore sent pursuant to, i.e., in furtherance of the sending of the second page message on the second page channel.

In the event that the first quick page indication slot monitored by the message detector indicates no page message broadcast to the access terminal, the state controller 84 places the access terminal into a sleep mode. If a first of the quick page indication slots monitored by the detector indicates a page to have been broadcast, but a second of the quick page indication slots monitored by the detector indicates no page, the state controller 84 also causes the access terminal to enter into a low-power, sleep mode. Additional page indications, if more than two, are analogously monitored. The occurrence of a false wakeup is reduced as one or more additional quick page indications are monitored to provide further indication of whether a page has been sent to the access terminal.

Figure 2:
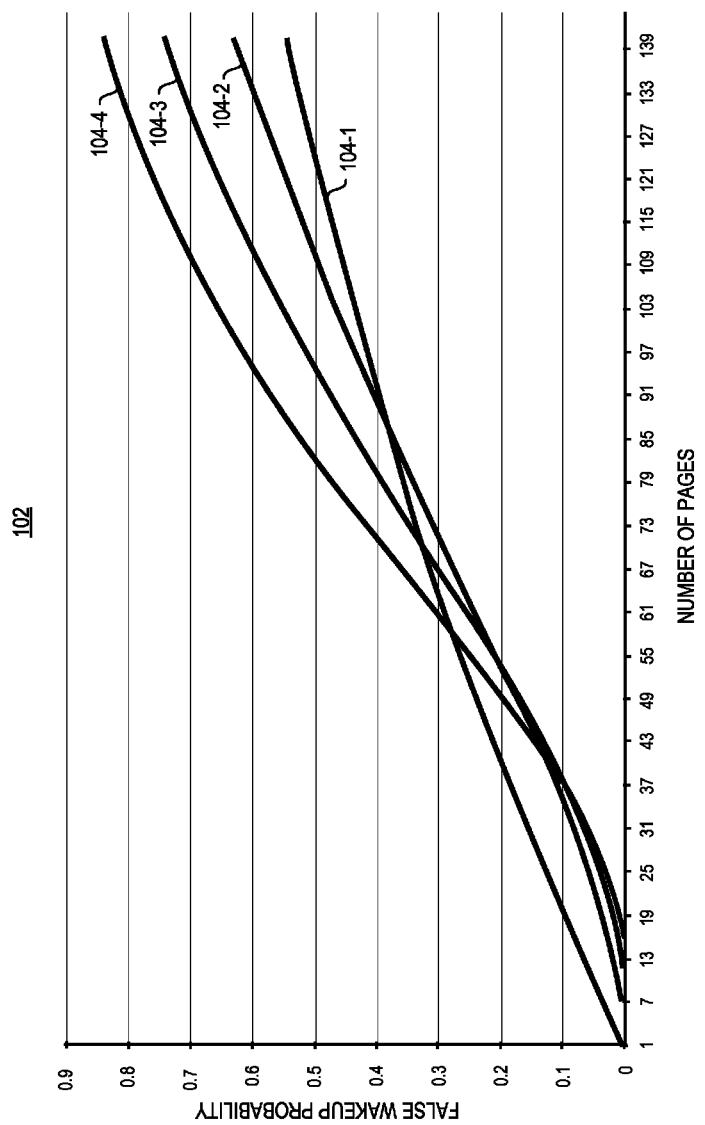
FIG. 2 illustrates a graphical representation of the relationship between the probability of occurrence of a false wakeup as a function of the number of pages in a multi-user communication system for various numbers of hashes.

FIG. 2 illustrates a graphical representation, shown generally at 102, that shows the relationship between the occurrence of false wakeup and the number of pages in the communication system 10 shown in FIG. 1, pursuant to exemplary operation. Plots 104 illustrate the general proportional relationship between the number of pages to access terminals in a multi-user communication scheme and the occurrence of false wakeup, represented in terms of probability. Four plots, plots 104-1, 104-2, 104-3, and 104-4, are shown. The plot 104-1 is representative of the relationship when a single page indication is provided to a particular access terminal in a page message to alert the access terminal of the page. A single hash value is generated, and the page indication is populated in a single page indication location determined by the single hash value. The plot 104-2 is representative of two page indication bits provided in the page message to alert a particular access terminal of the page. Two hash values are generated, and the page indication locations in which the page indications are positioned are determined by the two hash values. The plot 104-3 is representative of use of three page indications in a page message to alert a particular access terminal of the page. Three hash values are generated and their values are determinative of the positioning of the three page indication locations in which the page indications are populated. And, the plot 104-4 is representative of the relationship between false wakeup occurrences when four page indications are used in a page message to page the access terminal.

Review of the plots shows that the number of page indications in a page message that provides the lowest false wakeup probability for a given number of pages in the communication system, i.e., network activity, varies with the number of pages. Pursuant to operation of an embodiment of the present invention, advantage is taken of this relationship in the selection of the number of page indications to use per access terminal. Such selection is made, e.g., by the determiner 32 shown in FIG. 1. Selection is made in such a way as to minimize the false wakeup probability. For each number of pages, i.e., network activity, selection is made of the number of page indications that are to be used to page, in the quick page message, an access terminal. Using, for instance, plots analogous to the plots 104 shown in FIG. 2, the lowest curve for each of the number of pages, i.e., network activity, is selected. Analysis indicates that, when a number of pages is relatively small, the lowest probability of false wakeup occurs when greater number of page indications per access terminal are utilized. Conversely, at higher numbers of pages, i.e., network activity, lesser numbers of page indications provides the lowest false wakeup probabilities. Changeover occurs at various thresholds, indicated in the representation of FIG. 2 when plots cross one another.

Once determination and selection is made at the access network, indication of the selection is provided to an access terminal. The number of page indications, known at both the access network and at the access terminal, permits operation of the apparatus 24 and 26 in coordinated manner. In the exemplary implementation, the page indication values populating a quick page message are all received in the same message. The access terminal need not wake up at different times for separate bits as all of the bits of the message are received at once in the same message. Furthermore, the same page indicator values are hashed instead of, as previously utilized, making divisions into multiple physical groups. And, the page indication locations defined by the hash values are further able to be generated in a manner such that the page indication locations are dissimilar. Rotation of the input number used in the generation of the hash values decorrelates the hash values, and the introduction of time variance in the hash function also provides for hash value dissimilarity.

FIG. 3 illustrates an exemplary quick page message, shown generally at 108. The message is generated, for instance, with respect to the configuration shown in FIG. 1, at the message generator 54. The quick page message includes a plurality, here 33, page indication locations 112, numbered as 1-33. Initially, each page indication location is set to logical "0" values. Page indications for four access terminals 12, identified as AT1, AT2, AT3, and AT4, are represented in the message 108. A hash generator generates hash values of 8 and 6 for the access terminal AT1. And, page indication locations 8 and 6 are populated with values to indicate whether the access terminal AT1 is paged. Here, the logical values "1" are inserted into the page indication locations 8 and 6 that identify that the AT1 is paged. Analogously, with respect to the access terminal AT2, the hash generator generates hash values of 7 and 21, and page indications are inserted into page indication locations 7 and 21 to identify that the access terminal AT2 is paged. Hash values 21 and 13 generated with respect to the access terminal AT3 cause page indication locations 21 and 13 to be populated with page indication bits to identify, here, that the access terminal AT3 is paged. And, hash values generated with respect to the access terminal AT4 of 25 and 3 cause the page indication locations 25 and 3 to be populated with page indication bits, here again to identify that the access terminal AT4 is paged. In this implementation, any of the page indication locations of the message 108 are available to be populated with page indication bits associated with any of the access terminals. And, as indicated at the page indication location 21, a page indication location might include a page indication bit associated with more than one of the access terminals. Ideally, the hash generator generates hash values that permit even, viz. equal, distribution of page indication values across the entire message 108. Each hash for a particular access terminal hashes over the same page indication location in contrast to conventional procedures. And, through use of the time factor, the occurrence of repeated generation of hash values of similar values, and corresponding population of the same page indication locations, for a particular access terminal, is unlikely.

FIG. 4 illustrates another message, here shown generally at 116 that also includes thirty-three page indication locations 112 that are populated with page indication values, here again to page access terminals AT1, AT2, AT3, and AT4. Here, the message is divided into two groups, a first group 118, and a second group 122. Initially, here also, each page indication location is set to logical "0" values. In this implementation, only a single page indication location per group is available for page indicator values associated with a particular access terminal. That is to say, with respect to the access terminal AT1, a single page indication location in the first group is available, and a single page indication location in the second group is available. When a hash value generated by the hash value generator is of a value within the first group, another hash value must be of a value within the second group. Ideally, the hash generator generates hash values that permit even distribution of page indication values across each group of the message. And, as shown in the representation of FIG. 4, a page indication location is available to each of the access terminals in the first group and in the second group. The example shown in FIG. 4 is for an implementation in which two page indication bits are available within the page message per access terminal. If additional page indication bits are available, the page message is divided into additional numbers of groups of substantially equal size, and the page indication locations are correspondingly made available in each of the additional numbers of groups.

Figure 5:
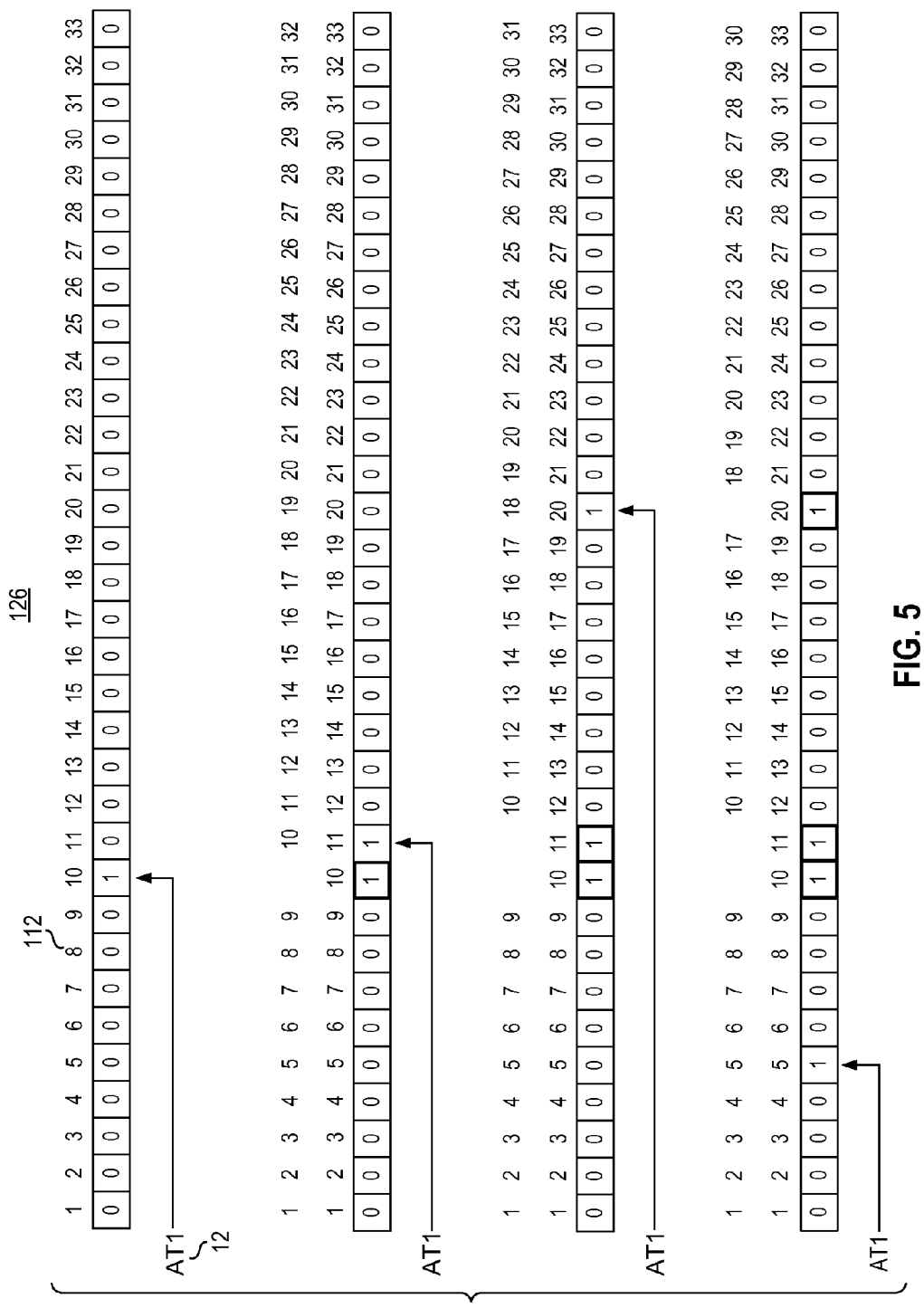
FIG. 5 illustrates formation of an exemplary quick page message pursuant to operation of another exemplary embodiment of the present invention.

FIG. 5 illustrates a quick page message 126 and the manner by which a hash generator operates pursuant to another embodiment. Here, four page indication locations are made available to the access terminal AT1 over the thirty-three bits of the quick page message. And, again, each page indication location is initially set to logical "0" values. When a hash value is selected and the page indication location 112 determined therefrom is used, that page indication location is no longer available to that access terminal at which to populate the message with another page indication value. That is to say, a hash value cannot be repeated for that access terminal. In the representation shown in FIG. 5, a first page indication value is populated in page indication location 10. Here also, ideally, the hash generator generates hash values that permit even distribution of page indications across all of the available page indication locations. As noted below, when a page indication location is used, the location becomes no longer available. Page indication location 10 is no longer available for the access terminal AT1. A next-generated hash value is of 11 and a page indication bit is inserted into the page indication location 11. Thereafter, neither page indication locations 10 nor 11 are available. A subsequently-generated hash value of 20 causes the page indication value to be inserted into page indication location 20. And, thereafter, page indication locations 10, 11, and 20 are no longer available. A fourth-generated hash value of 5 is generated, and the page indication location 5 is populated with a page indication value. In this implementation, use of a time factor is generally not required.

Figure 6:
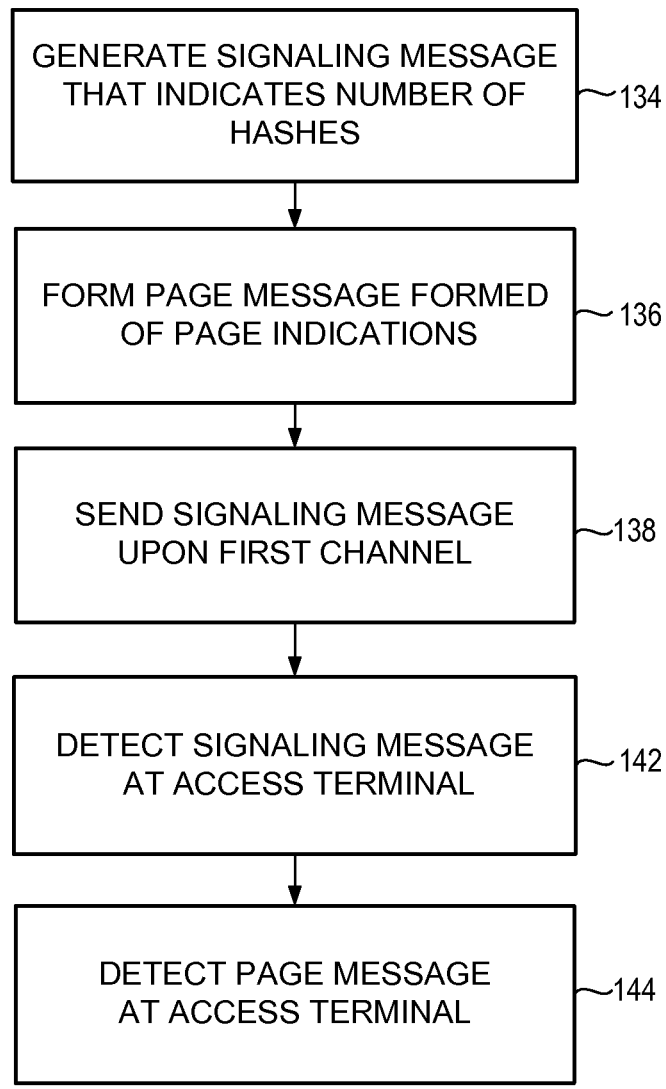
FIG. 6 illustrates a method flow diagram representative of the method of operation of an embodiment of the present invention.

FIG. 6 shows a method flow diagram, shown generally at 132, representative of exemplary operation of an embodiment of the present invention for a communication system that selectably generates page messages on a first channel.

First, and as indicated by block 134, a signaling message is generated that indicates a selected number of hashes to page indications that shall be generated within a page message sent upon the first channel. Then, and as indicated by the block 136, a page message is formed of the page indications corresponding to the selected number of hashes.

As indicated by the block 138, the signaling message is sent upon the first channel. The signaling message is detected, indicated by the block 142, at an access terminal together with the selected number of hashes to quick page indicator slots that are contained in the signaling message. And, as indicated by the block 144, the page message is detected at the access terminal, and a determination is made whether the page message includes the page indications corresponding to the selected number of hashes.

The aforementioned embodiments describe different ways that multiple bits per page can be hashed in a Quick Page message. In these methods, a number of bits from n available bits are hashed for each AT.

The hashing method that provides the lowest false wakeup probability for a number of bits hashed per page is as follows:

Hash a first bit of the available n bits at random as the first paging indicator.

Hash a second bit of n−1 bits at random, excluding the first hashed bit, as the second paging indicator.

Hash a third bit of n−2 bits at random, excluding the first and second hashed bits, as the third paging indicator.

... and so on depending upon the number of hashed bits per page.

The following describes details of ways of implementing this hashing method that are very simple and efficient to implement in an AT and in an AN. For example, the following pseudocode illustrates an improved way of implementing this hashing method:

```
// Init
For( i = 0; i < maxBits; i++)
  Bits [ i ] = i;
For( j = 0; j < maxPI; j++)
{
  Rnd = random( 0, maxBits − j − 1);
  PI [ j ] = Bits[ Rnd ];
  Bits [ Rnd ] = Bits [ maxBits − j − 1]; }
Return PI [ ];
```

The method uses an array, Bits, with a number of entries corresponding to the number of available paging indicators. The array is initialized such that each entry is equal to its index. For the first paging indicator a first number is hashed randomly based upon the number of paging indicators. This number is used as an index into the array, Bits; the value of the array at this index is selected as the first paging indicator. The value of the array at this index is then assigned to the value of the last entry in the array. For the second paging indicator a second number is hashed randomly based upon the number of paging indicators minus one. This number is used as an index into the array, Bits; the value of the array at this index is selected as the second paging indicator. The value of the array at this index is then assigned to the value of the entry in the array next to the last entry in the array. The method continues based upon the number of paging indicators per page.

This method can be integrated with the Quick Page message published in the 3GPP2 specification C.S0024-B v1.0, using the hash function in section 14.4 of C.S0024-B v1.0.

Figure 7:
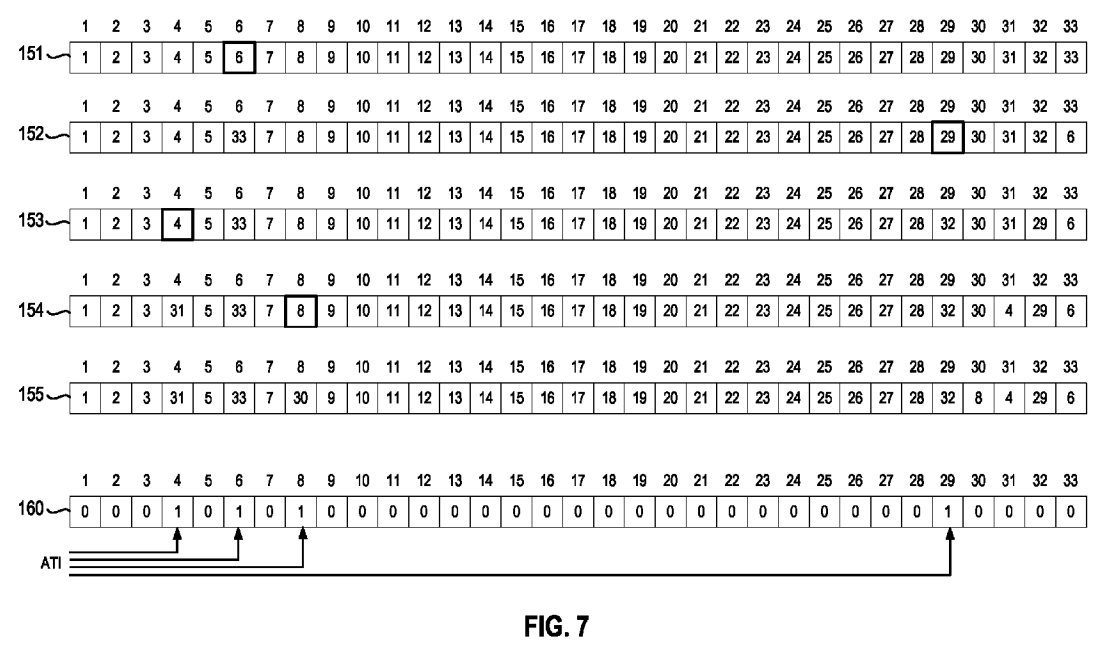

FIG. 7 shows an example of the above procedure being used to select paging indicators for an AT, AT1. It should be noted that although the above pseudocode uses 0 as the index to the first array entry, FIG. 7 uses 1 as the index to the first array entry. 151, 152, 153, 154, and 155 illustrate an array and show how the entries are arranged after successive steps. Entries in array 151 are shown below the indexes into the array; each value in the array is shown below the corresponding index. The array has the same number of entries as the number of paging indicators available for hashing on the QPCH; in this example there are 33 available paging indicators, so there are 33 entries in the array. In this example, there are four paging indicators per page, so four paging indicators will be selected. The array is first initialized such that each array entry is equal to its associated index; this is shown by 151. Next a first value in the range 1 to 33 is randomly hashed; in this example the hashed value is 6. The array entry at index 6 (in this case, 6) is chosen as the first paging indicator and is shown shaded in array 151. The array value (6) at the index value of the first hash is then swapped with the array value at the last entry in the array (33).

The updated array after this swap step is shown by 152. Next a value in the range 1 to 32 is randomly hashed; in this example the hashed value is 29. The array entry at index 29 (in this case, 29) is chosen as the second paging indicator and is shown shaded in array 152. The array value (29) at the index value of the second hash is then swapped with the array value at the next to last entry in the array (32).

The updated array after this swap step is shown by 153. Next a value in the range 1 to 31 is randomly hashed; in this example the hashed value is 4. The array entry at index 4 (in this case, 4) is chosen as the third paging indicator and is shown shaded in array 153. The array value (4) at the index value of the third hash is then swapped with the array value at the second to last entry in the array (31).

The updated array after this swap step is shown by 154. Next a value in the range 1 to 30 is randomly hashed; in this example the hashed value is 8. The array entry at index 8 (in this case, 8) is chosen as the fourth paging indicator and is shown shaded in array 154. The array value (8) at the index value of the fourth hash is then swapped with the array value at the third to last entry in the array (30). The updated array after this swap step is shown by 155. After this step, four paging indicators have been selected and are shown as the final four entries in the array.

160 shows the content of a quick page message with the paging indicators for only AT1 set. Paging indicators 4, 6, 8, and 29 are equal to '1' and all other paging indicators are equal to '0'.

It should be noted that in the particular example of FIG. 7, there is no effect on the result of swapping array entries. The hashed values themselves are the same as the paging indicators. In other instances, the same value may be hashed more than once; in such a case the selected paging indicator will be different from the hashed value and this will be shown in FIG. 8.

Figure 8:
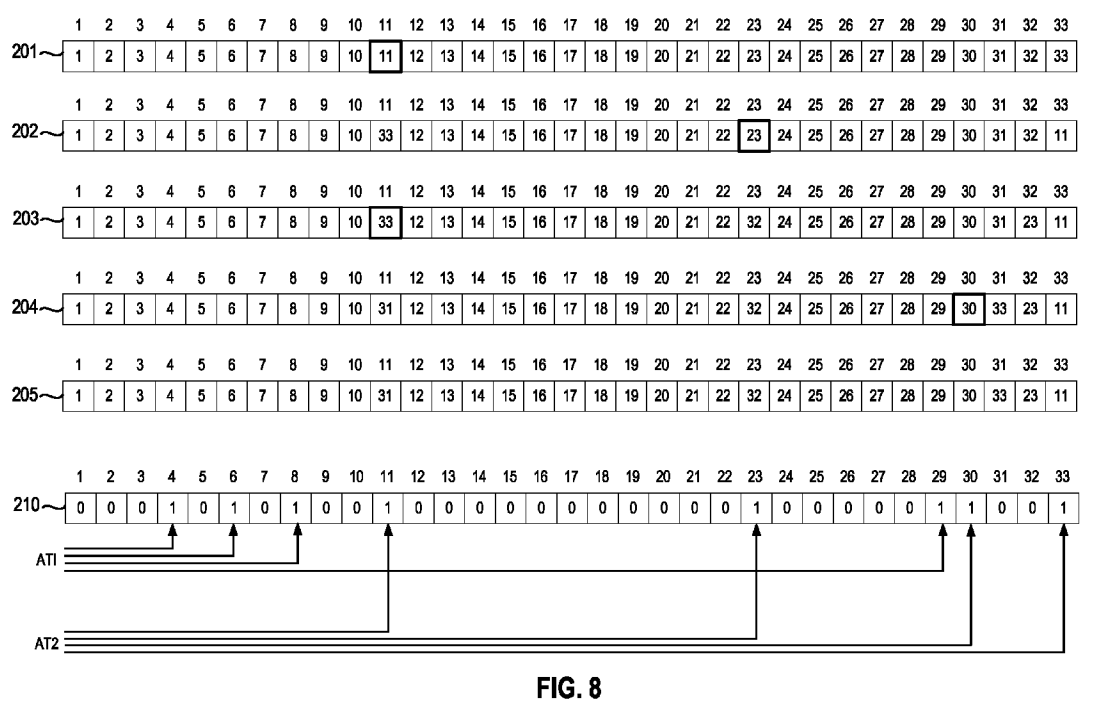

FIG. 8 shows another example of the above procedure being used to select paging indicators for an AT, AT2. It should be noted that although the above pseudocode uses 0 as the index to the first array entry, FIG. 8 uses 1 as the index to the first array entry. 201, 202, 203, 204, and 205 illustrate an array and show how the entries are arranged after successive steps. Entries in array 201 are shown below the indexes into the array; each value in the array is shown below the corresponding index. The array has the same number of entries as the number of paging indicators available for hashing on the QPCH; in this example there are 33 available paging indicators, so there are 33 entries in the array. In this example, there are four paging indicators per page, so four paging indicators will be selected. The array is first initialized such that each array entry is equal to its associated index; this is shown by 201. Next a first value in the range 1 to 33 is randomly hashed; in this example the hashed value is 11. The array entry at index 11 (in this case, 11) is chosen as the first paging indicator and is shown shaded in array 201. The array value (11) at the index value of the first hash is then swapped with the array value at the last entry in the array (33).

The updated array after this swap step is shown by 202. Next a value in the range 1 to 32 is randomly hashed; in this example the hashed value is 23. The array entry at index 23 (in this case, 23) is chosen as the second paging indicator and is shown shaded in array 202. The array value (23) at the index value of the second hash is then swapped with the array value at the next to last entry in the array (32).

The updated array after this swap step is shown by 203. Next a value in the range 1 to 31 is randomly hashed; in this example the hashed value is 11. The array entry at index 11 (in this case, 33) is chosen as the third paging indicator and is shown shaded in array 203. The array value (33) at the index value of the third hash is then swapped with the array value at the second to last entry in the array (31).

The updated array after this swap step is shown by 204. Next a value in the range 1 to 30 is randomly hashed; in this example the hashed value is 30. The array entry at index 30 (in this case, 30) is chosen as the fourth paging indicator and is shown shaded in array 204. The array value (30) at the index value of the fourth hash is then swapped with the array value at the third to last entry in the array (30). The updated array after this swap step is shown by 105; it should be noted that the values shown in 105 are the same as the values shown by 104 are the same because the fourth hash happened to be the same as the third to last index into the array (30). After this step, four paging indicators have been selected and are shown as the final four entries in the array.

210 shows the content of a quick page message with the paging indicators for both AT1 from FIG. 7 and AT2 from FIG. 8 set. Paging indicators 11, 23, 30, and 33 associated with AT2 are equal to '1'; paging indicators 4, 6, 8, and 29 associated with AT1 are equal to '1' and all other paging indicators are equal to '0'.

There is another method that can be used to obtain equivalent results as with the above method, but without using an array; this alternative method is suitable for low numbers of paging indicators.

For example, suppose there are 33 bits available for paging indicators and there are two paging indicators per page. A first hash will hash a number randomly from 1 to 33. A second hash will hash a number randomly from 1 to 32. If the result of the first hash is not equal to the result of the second hash, the paging indicators will be equal to the result of the first hash and the result of the second hash. If the result of the first hash is equal to the result of the second hash, then one paging indicator will be 33 and the other paging indicator will be equal to the result of the two hashes. For example, suppose 9 is chosen for the first hash and 14 is chosen for the second hash; in this case, the paging indicators would be 9 and 14. As another example, suppose 8 is chosen for the first hash and 8 is chosen for the second hash; in this case, the paging indicators would be 8 and 33.

As another example, suppose there are 33 bits available for paging indicators and there are three paging indicators per page. A first hash will hash a number randomly from 1 to 33. A second hash will hash a number randomly from 1 to 32. A third hash will hash a number randomly from 1 to 31. If the results of all of the three hashes are all different, then the paging indicators will be equal to the result of the first, second, and third hashes. If the results of all three hashes are the same, one paging indicator will be 33, another paging indicator will be 32, and the other paging indicator will be the hashed value. If the results of the first and second hashes are the same, but different from the third hash, then one paging indicator will be 33, another will be the value of the first and second hashes, and another will be the value of the third hash. If the results of the first and third hashes are the same, but different from the second hash, the one paging indicator will be 33, another will be the value of the first and third hashes, and another will be the value of the second hash. If the results of the second and third hashes are the same, but different from the first hash, the one paging indicator will be 32, another will be the value of the first hash, and another will be the value of the second and third hashes. For example, suppose 10 is chosen for the first hash, 19 is chosen for the second hash, and 3 is chosen for the third hash; in this case, the paging indicators would be 10, 19, and 3. As another example, suppose 12 is chosen for the first hash, 12 is chosen for the second hash, and 12 is chosen for the third hash; in this case, the paging indicators would be 12, 32, and 33. As another example, suppose 7 is chosen for the first hash, 7 is chosen for the second hash, and 21 is chosen for the third hash; in this case, the paging indicators would be 7, 21, and 33. As another example, suppose 25 is chosen for the first hash, 1 is chosen for the second hash, and 25 is chosen for the third hash; in this case, the paging indicators would be 1, 25, and 33. As another example, suppose 19 is chosen for the first hash, 8 is chosen for the second hash, and 8 is chosen for the third hash; in this case, the paging indicators would be 8, 19, and 32.

This alternative method can similarly be used for four and more paging indicators per page, but the logic will be increasingly complex because the number of combinations of duplicate hashes increases for larger numbers of paging indicators per page.

Based upon recent discussion in 3GPP2, it is thought that for the EV-DO Release BQPCH, a fixed number of three paging indicators per page will likely be adopted. Using three paging indicators per page gives a low probability of falsely waking up for a page and thus would give good performance as far as power consumption goes.

There are two physical layer transmission formats that can be used to transmit the Quick Page Message in EV DO Release B. The Quick Page Message can be sent in a physical layer packet of either size 128 bits or 256 bits, Due to the overhead (header bits, error correction, etc.) in sending a Quick Page Message, the number of bits available for paging indicators is approximately 72 for the 128 bit transmission format and 200 bits for the 256 bit transmission format. FIGS. 9-12 show the false wakeup probabilities for various numbers of paging indicators per page, including a variable paging indicator per page method. Graphs for both the 128 bit and 256 bit transmission formats are shown in FIGS. 9, 10, 11, and 12.

Co-pending patent application of U.S. provisional application Ser. No. 60/825,214 includes the idea of allowing an AT to respond to a Quick Page with a Page Response without monitoring for the regular page message if the probability of a false match is acceptably low.

Figure 9:
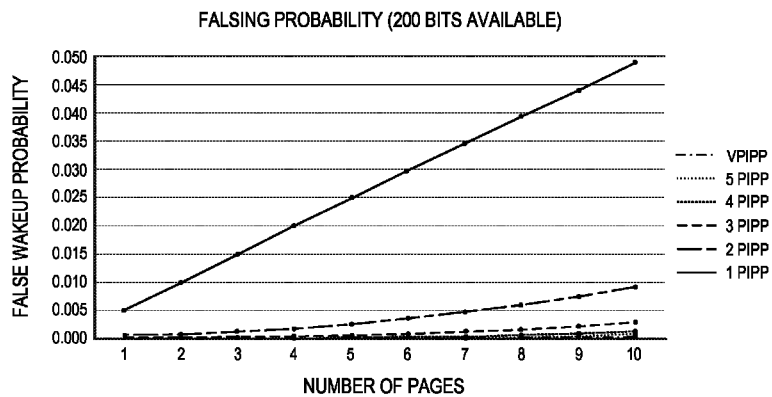
FIGS. 9-12 illustrate graphical representations of relationships between numbers of pages and false wakeup probabilities.
Figure 10:
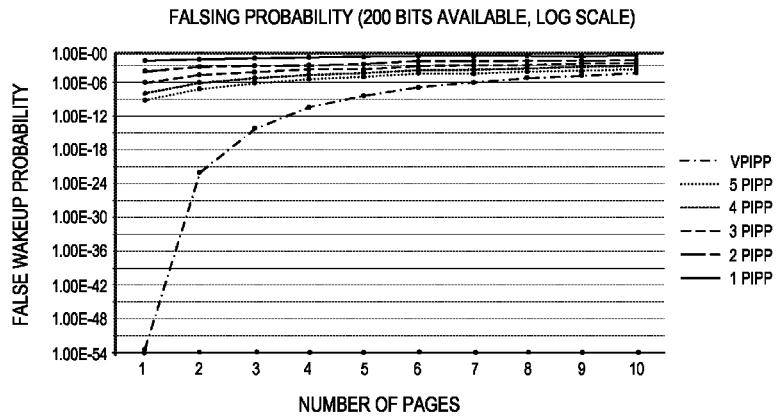
Figure 11:
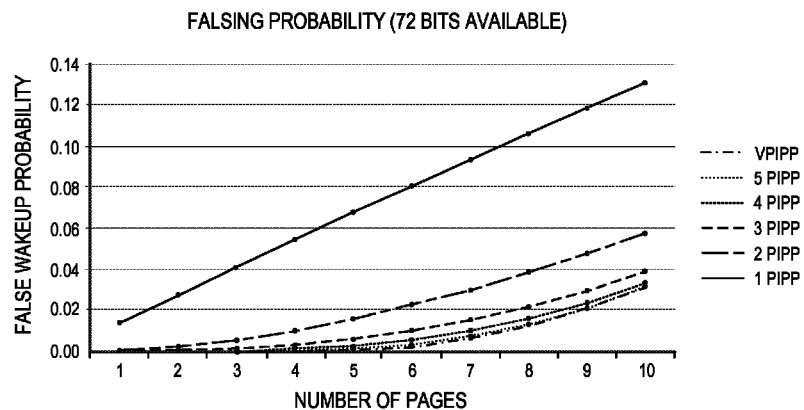
Figure 12:
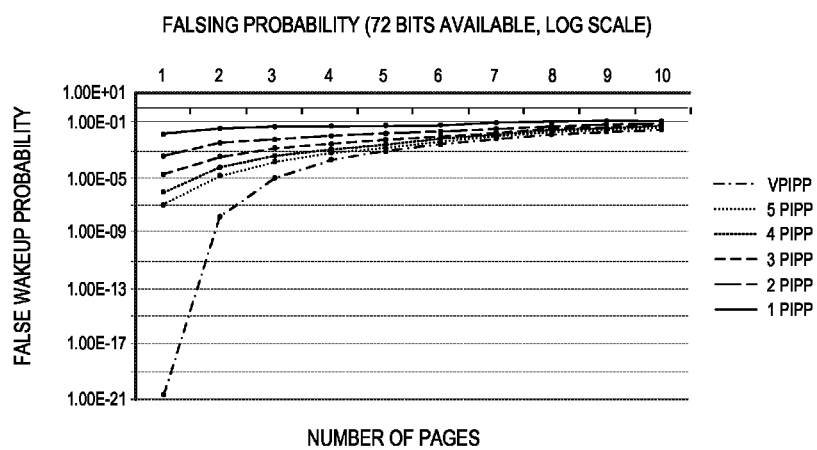

As can be seen from the log-scale graphs of FIGS. 9 and 11, with 72 or 200 bits available for paging indicators, the falsing rate using paging indicators with an optimal Variable number of Paging Indicators Per Page (VPIPP) method can be very low. For example, with 200 bits available for paging indicators, the falsing probability for 1 to 6 pages using VPIPP is lower than 106. With such a low falsing probability, ATs could safely send a page response after only receiving the Quick Page with a negligible impact on the reverse link. For more than 6 pages, the falsing rate may be too high, however. Similarly, with 72 bits available for paging indicators, the falsing probability for 1 to 2 pages using VPIPP is lower than 106. With such a low falsing probability, ATs could safely send a page response after only receiving the Quick Page with a negligible impact on the reverse link, For more than 2 pages, the falsing rate may be too high, however. Therefore, if VPIPP is used, the AN would preferably use the 128 bit transmission format if there are one or two pages. If there are more than two pages, but fewer than 7, then the AN would preferably use the 256 bit transmission format if there are pages being sent associated with services that demand low latency; otherwise the AN would preferably use the 128 bit transmission format. It should be noted that it may often be preferable to use the 128 bit transmission format rather than the 256 hit transmission format even though the false wakeup probability is higher with the 128 bit transmission format because the 128 bit transmission format is more reliable and more likely to be received by the ATs in the coverage area of the sector that is sending the page.

It should be noted, however, that when using a fixed number of 3 paging indicators per page, the 128-bit transmission format would never give an acceptably low false page response rate to allow page response based on the Quick Page Message alone. The 256-bit bit transmission format would give an acceptably low false page response rate to allow page response based on the Quick Page Message alone only for the case of one page.

It would be desirable if it were possible to use a fixed number of 3 paging indicators per page and to allow page responses based on the Quick Page message alone for the 128-bit transmission format and also it would be desirable with a fixed number of 3 paging indicators per page to allow more ATs to respond based on the Quick page message alone for the 256-bit transmission format.

An embodiment of the present invention includes a new message structure that makes it possible to send both paging indicators and partial identities (in this case, partial Access Terminal Identifiers or ATIs) in the same quick page message at the same time. Because partial ATIs can give very low false wakeup probabilities, their use can enable ATs with low latency requirements to be paged in the same quick page message with paging indicators that would not result in a low enough falsing probability. The below modifications, indicated by underlining, to the Quick Page message from C.S0024-B show an example message structure of an embodiment of the present invention.

The access terminal may transition to the Sleep State if both of the following requirements are met: a) The access terminal entered the Monitor State to receive a quick synchronous capsule and received a QuickPage message with none of the Partial ATI fields in the QuickPage message equal to the corresponding bits of the AT's ATI and with any of its assigned QuickPageIndicator fields PI1, PI2, or PI3 set to '0' and the ConfigurationChange field not set to '11', and b) the access terminal has determined that the SectorParameters message is up to date.

The Access terminal may determine its three assigned paging indicators PI1, PI2, and PI3 in the QuickPage message using the following procedure. First, the AT sets H1 equal to the result of applying the hash function using the following parameters: Key=SessionSeed, which is provided as public data of the Address Management Protocol; N=1+QuickPageIndicatorCountMinusOne field of the QuickPage message, and Decorrelate=0xa241.

Second, the AT sets H2 equal to the result of applying the hash function using the following parameters: Key=SessionSeed; N=QuickPageIndicatorCountMinusOne; and Decorrelate=0xa241.

Third, the AT sets H3 equal to the result of applying the hash function using the following parameters: Key=SessionSeed; N=QuickPageIndicatorMinusOne−1; and Decorrelate=0xa241.

Next, the AT sets PI1 equal to H1. Additionally, the AT sets PI2 equal to QuickPageIndicatorCountMinusOne if H1 is equal to H2; otherwise the AT shall set PI2 equal to H2. Further, the AT sets PI3 equal to QuickPageIndicatorCountMinusOne−1 if H2 is equal to H3; otherwise the AT sets PI3 as follows: The AT shall set PI3 equal to QuickPageIndicatorCountMinusOne if H1 is equal to H3; otherwise the AT sets PI3 equal to H3.

The access network sends the QuickPage message to inform the access terminal of the likelihood of a Page message directed to the access terminal. In one embodiment, the page message is formatted as indicated below.

| Field | Length (bits) |
| --- | --- |
| MessageID | 8 |
| ConfigurationChange | 2 |
| QuickPageIndicatorCountMinusOne | 8 |
| QuickPageIndicatorCountMinusOne + 1 occurrences of the following field: | |
| QuickPageIndicator | 1 |

Additional fields include a PartialA TIcount field, a BitsPerPartialATI field, a PartialATIcount occurrences field, and a PartialATI field: where PartialATIcount is of a length of 3 bits; BitsPerPartialATI is of a length of 0 or 2 bits; PartialATIcount occurrences of the following field: PartialATI is of a length of 16, 20, 24, or 28 bits.

The Configuration Change field is set as follows: If the Redirect public data of the Overhead Message Protocol is '1', then the access network sets this field to '1'. Otherwise, the access network sets this field as follows: Every time an OverheadMessages.ConfigurationChanged indication is received, the access network shall set this field in subsequent QuickPage messages to one more (modulo '11') than the last value of this field before the indication was received and when the Redirect public data of the Overhead Message Protocol was '0'.

The QuickPageIndicatorCountMinusOne field is set by the access network to one less than the number of occurrences of the QuickPageIndicator field in this message.

The QuickPageIndicator field is set for each access terminal to which a unicast message is to be directed in, the synchronous, or sub-synchronous capsule that follows the quick synchronous capsule in which this message is sent. The access network sets the associated paging indicators PI1, PI2, and PI3. The associated occurrence of this field shall be set to '1' if it corresponds to one of the associated paging indicators. The access network determines each access terminal's associated paging indicators PI1, PI2, and PI3 using the following procedure. First, the AN sets H1 equal to the result of applying a hash function using the following parameters: Key=SessionSeed, which is provided as public data of the address management protocol; N=1+QuickPageIndicatorCountMinusOne field of the QuickPage Message, and Decorrelate=0xa241.

Next, the AN sets H2 equal to the result of applying the hash function using the following parameters: Key=SessionSeed; N=QuickPageIndicatorCountMinusOne−1, and Decorrelate=0xa241.

Then, the AT sets PI1 equal to H1. Additionally, the AN sets PI2 equal to QuickPageIndicatorCountMinusOne if H1 is equal to H2; otherwise the AN sets PI2 equal to H2. Further, the AN sets PI3 equal to QuickPageIndicatorCountMinusOne if H2 is equal to H3; otherwise the AN shall set PI3 as follows: the AN sets PI3 equal to QuickPageIndicatorCountMinusOne if H1 is equal to H3; otherwise the AN sets PI3 equal to H3.

For .PartialATIcount: The access network sets this field to the number of partial ATIs to be included in this message. For, BitsPerPartialATI: If PartialATIcount is equal to '000', the access network omits this field; otherwise the access network sets this field to specify the number of bits included for each Partial ATI in this message as follows:

| BitsPerPartialATI | Number of bits included for each Partial ATI |
|---|---|
| '00' | 16 bits |
| '01' | 20 bits |
| '10' | 24 bits |
| '11' | 28 bits |

The access network includes PartialATIcount occurrences of this field in the message. The ATI sets this field to a number of least significant bits of the AT's ATI (including the least significant bit and including a number of more significant bits), the number of bits is based upon BitsPerPartialATI.

The access network adds reserved bits to make the length of the entire message equal to an integer number of octets. The access network sets this field to zero. The access terminal generally ignores this field.

In the above Quick Page message a number of partial ATIs may be included, where the PartialATIcount field specifies the number of partial ATIs included. The length of the partial ATIs is specified by the BitsPerPartialATI field.

Upon receiving the message, the AT may go to sleep and avoid waking up for the regular page if none of the PartialATI fields match the corresponding bits of the AT's ATI and if any of the AT's paging indicators are '0'.

The AN will have stored latency requirements associated with ATs that are being paged. The AN will also store AT capability information that lets the AN know whether ATs support PartialATIs in the Quick Page message. This is needed in order to be able to add PartialATIs to the Quick Page message in a backwards-compatible manner. If an AT is being paged that supports PartialATIs and which requires low latency, the AN can use a partial ATI in the Quick Page to page that AT.

For example, suppose three ATs are being paged. Two of them do not require low latency, but another AT requires low latency and supports partial ATIs. The AN would use the 28-bit transmission format for the quick page message. The AN would set the PartialAT count field equal to '001'. The AN would set the BitsPerPartiaiATI field to '10'. The AN would include the least significant 24 bits of the low latency paged AT's ATI in the Partial ATI field. In order to accommodate the extra 29 bits for the PartiaiATIcount, BitsPerPartia-1ATI, and PartialATI fields, the AN will reduce the number of QuickPageIndicator fields by 29. The low latency AT will read the Quick Page message and compare the least significant 24 bits of its ATI to the PartialATI field in the quick page message; it will detect a match and respond to the page immediately by sending a page response.

For another example, suppose five ATs are being paged. One of them does not require low latency, but the four other ATs require low latency and all support partial ATIs. The AN would use the 256-bit transmission format for the quick page message because four partial ATIs would not result in both quick page response for all delay-sensitive ATs and low QPCH falsing with the 128-bit format. The AN would set the PartialATIcount field equal to '100'. The AN would set the Bits PerPartialATI field to '10'. The AN would include the least significant 24 bits of the low latency paged ATs' ATIs in the four Partial ATI fields. In order to accommodate the extra 101 bits for the PartialATIcount, the BitsPerPartialATI, and the PartialATI fields, the AN will reduce the number of QuickPageIndicator fields by 101. The low latency ATs will read the Quick Page message and compare the least significant 24 bits of their ATIs to the PartialATI fields in the quick page message; they will detect a match and respond to the page immediately by sending a page response.

The aforementioned 3GPP2 C.S0024-B v 2.0 document calls for a multiple-group, multiple paging indicator method. The method uses a different Decorrelate value for each hashed PI. Specifically, the following has been agreed for the Quick Page Indicator hashing for C.S0024-B v2.0: 1) the C.S0024-B v2.0 Quick Page Message shall use 4 PIs per page; 2) the paging indicators in the Quick Page Message shall be divided into four equal-sized bins, where each of the four PIs shall be hashed into a different one of the four bins; 3) each of the four PIs shall be generated using the hash function with the following inputs: a) Key=SessionSeed; b) N=(Number of Paging Indicators in the message)/4; c) a different Decorrelate value for each PI; 4) an offset is added to each hash to place the PI in its bin.

The following hash function may be used to hash the 4 PIs for each page:

The hash function takes three arguments, Key, N (the number of resources), and Decorrelate (an argument used to de-correlate values obtained for different applications for the same access terminal).

Define:

Word L to be bits 0-15 of Key

Word H to be bits 16-31 of Key where bit 0 is the least significant bit of Key.

The hash value is computed as follows:

$$R = \lfloor N \times ((40503 \times (L \oplus H \oplus Decorrelate)) \mod 2^{16})/2^{16} \rfloor.$$

The following notations are used:

$\lfloor x \rfloor$ Indicates the largest integer less than or equal to x: $\lfloor 1.1 \rfloor = 1$, $\lfloor 1.0 \rfloor = 1$.

$\oplus$ Indicates exclusive OR (modulo-2 addition).

x mod y Indicates the remainder after dividing x by y: x mod $y = x - (y \times \lfloor x/y \rfloor)$.

M[i:j] Bits $i^{th}$ through $j^{th}$ inclusive (i≥j) of the binary representation of variable M.

M[0:0] denotes the least significant bit of M.

So far, for the Decorrelate values for the 4PIs, all that has been specified is that the Decorrelate value for each PI should be different. A simple way to make the Decorrelate values different is to increment Decorrelate by one for each PI. For example, if the first PI were to use a Decorrelate value of 0xa241, the second, third, and fourth PIs would be 0xa242, 0xa243, and 0xa244, respectively. The "0x" in "0xa241" indicates hexadecimal notation, i.e., that a241 is a hexadecimal number.

A simulation has shown, however, that using Decorrelate values incremented by one for each PI gives high probability of false wakeup (i.e., a mobile wakes up for the regular page message to check for a page when it is not being paged). It is the intent of the invention to determine Decorrelate values that will give a much lower probability of false wakeup.

The following shows the binary values for the Decorrelate values incremented by one for each PI:

Decorrelate for PI1→1010 0010 0100 0010

Decorrelate for PI2→1010 0010 0100 0011

Decorrelate for PI3→1010 0010 0100 0100

Decorrelate for PI4→1010 0010 0100 0101

Decorrelate for PI1 can also be represented by DPI1, and so forth. DPI2, DPI3, and DPI4 can all be represented in terms of DPI1 XOR a bit mask:

DPI2=DPI1⊕0000 0000 0000 0001
DPI3=DPI1⊕0000 0000 0000 0110
DPI4=DPI1⊕0000 0000 0000 0111

The number of 1s in each bit mask is equal to the number of bits of DP1 that must be flipped to arrive at the other Decorrelate value.

The Decorrelate values only differ in the least significant bits which are shown italicized. Between the Decorrelate values for the PI3 and PI4 there is a 3-bit difference. Between the Decorrelate values for PI1 and PI2, PI1 and PI4, and PI2 and PI5, there is a 2-bit difference. Between the Decorrelate values for PI1 and PI3, and PI2 and PI3, there is only a 1bit difference. The high false wakeup probability is largely due to the fact that there is so little difference in the Decorrelate values for the four PIs.

In order to reduce the false wakeup probability, bit masks for the Decorrelates of PI2, PI3, and PI4 should have more differences. For example, the following bitmasks will give at least a 5-bit difference between the various Decorrelate values:

DPI2=DPI1⊕0000 0000 0001 1111
DPI3=DPI1⊕0000 0011 1110 0000
DPI4=DPI1⊕0111 1100 0000 0000

For this set of bitmasks, between the Decorrelate values for PI1 and PI2, PI1 and PI3, and PI1 and PI4, there is a 5-bit difference. Between the Decorrelate values for PI2 and PI3, PI2 and PI4, and PI3 and PI4, there is a 10-bit difference. Because there are more bit differences between the Decorrelate values of the different PIs, this set of Decorrelate values gives better performance than the first example.

In order to further reduce the false wakeup probability, another set of Decorrelate values can be constructed that has at least four differences between each pair of Decorrelate values. Each Decorrelate value is made up of four 4-bit nibbles. The Decorrelate values will differ in the same bit position(s) of each nibble. The following bitmasks will give at least four differences between each pair of Decorrelate values and will result in bit difference in the same bit position of each nibble of the Decorrelate values:

DPI2=DPI1⊕0001 0001 0001 0001
DPI3=DPI1⊕0010 0010 0010 0010
DPI4=DPI1⊕0100 0100 0100 0100

For this set of bitmasks, each nibble for a particular bitmask is the same. For this set of bitmasks, between the Decorrelate values for PI1 and PI2, PI1 and PI3, and PI1 and PI4, there is a 4-bit difference. Between the Decorrelate values for PI2 and PI3, PI2 and PI4, and PI3 and PI4, there is an 8-bit difference. DP1 and DP2 differ in the least significant bit position of each of the four nibbles. DP1 and DP3 differ in the second-to-least significant bit position of each of the four nibbles. DP1 and DP4 differ in the third-to-least significant bit position of each of the four nibbles. DP2 and DP3 differ in the least significant and second-to-least significant bit position of each of the four nibbles. DP2 and DP4 differ in the least significant and third-to-least significant bit position of each of the four nibbles. DP3 and DP4 differ in the second-to-least significant and third-to-least significant bit position of each of the four nibbles. So with this method, if the Decorrelate value for PI1 is 0xa242, the Decorrelate values for subsequent PIs would be 0xb353, 0x8060, and 0xe606. So 0xa242, 0xb353, 0x8060, and 0xe606 would be good-performing Decorrelate values, as would any four Decorrelate values with the same bitmasks.

In order to further reduce the likelihood of false wake-up, another set of Decorrelate values can be constructed that use different Decorrelate values to compute PI2, PI3, and PI4 in subsequent bins. These Decorrelate values are based on the Session Seed that is associated with a given mobile. Session Seed is itself a random number and is used as Key to the Hash function. The following Decorrelate values are used in this case:

DP1=0xA241
DP2=2*SessionSeed[11 . . . 0]
DP3=6*SessionSeed[11 . . . 0]
DP4=14*SessionSeed[11 . . . 0]

By selecting such Decorrelate values which depend on a mobile's assigned Session Seed, the probability of collision in $2^{nd}$, $3^{rd}$, and $4^{th}$ PI locations are reduced further. It should be noted that other non-zero values for DP1 could be used in combination with these DP2, DP3, and DP4 values.

Figure 13:
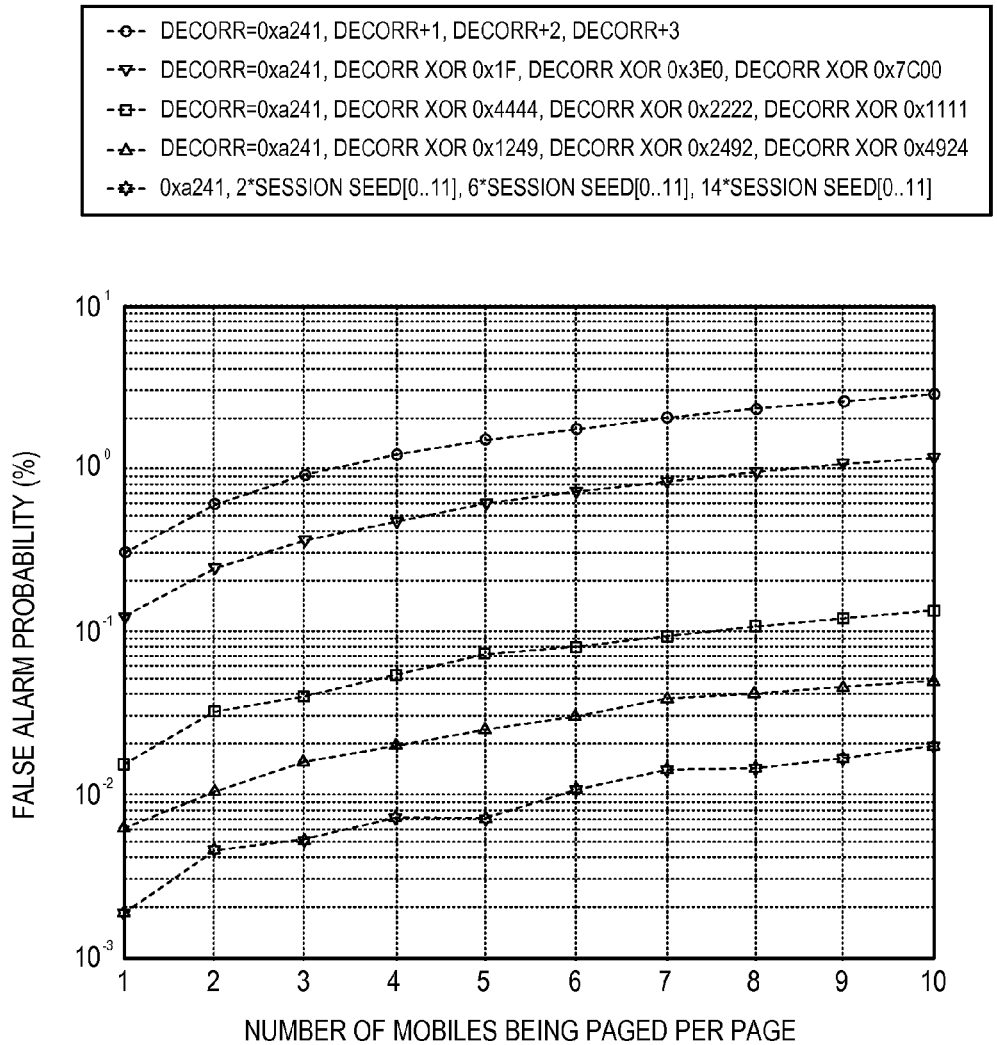
FIG. 13 illustrates graphical representations of the performance of various Decorrelate values.

FIG. 13, illustrates the performance of various Decorrelate values when there are 72 bits available for paging indicators, separated into four groups of 18 bits each. In this example, it is assumed that 100 mobile devices actively monitoring the channel and 1 to 10 mobiles are being quick paged. The top line is the False Alarm probability per number of mobiles being paged for Decorrelate values, where each Decorrelate value is incremented by one from the previous Decorrelate value. The bottom line shows the improvement when the Decorrelate values are chosen as multiples of the Session Seed as discussed above.

In section, 8.6.6.1.6.1.2. entitled, Transition to Sleep State, the section may be changed to require that the access terminal may transition to the Sleep State if all of the following requirements are met:

One of the following requirements is met:

The access terminal entered the Monitor State to receive a quick synchronous capsule and received a QuickPage message with the Wth QuickPageIndicator1 field set to '0', the Xth QuickPageIndicator2 field set to '0', the Yth QuickPageIndicator3 field set to '0', or the Zth QuickPageIndicator4 field set to '0', and the ConfiguratationChange field not set to '11', and has determined that the SectorParameters message is up to date (see 8.10.6.1.6).

W is the result of applying the hash function (see 14.4) using the following parameters:

Key=SessionSeed, which is provided as public data of the Address Management Protocol, N=1+QuickPageIndicatorCountMinusOne field of the QuickPage message, and Decorrelate=0xa241

X is the result of applying the hash function (see 14.4) using the following parameters:

Key=SessionSeed, which is provided as public data of the Address Management Protocol, N=1+QuickPageIndicatorCountMinusOne field of the QuickPage message, and Decorrelate=2×SessionSeed[11:0]

Y is the result of applying the hash function (see 14.4) using the following parameters:

Key=SessionSeed, which is provided as public data of the Address Management Protocol, N=1+QuickPageIndicatorCountMinusOne field of the QuickPage message, and Decorrelate=6×SessionSeed[11:0]

Z is the result of applying the hash function (see 14.4) using the following parameters:
Key=SessionSeed, which is provided as public data of the Address Management Protocol,
N=1+QuickPageIndicatorCountMinusOne field of the QuickPage message, and
Decorrelate=14×SessionSeed[11:0]
4.6.6.2.4 QuickPage The access network sends the QuickPage message to inform the access terminal of the likelihood of a Page message directed to the access terminal.

| Field | Length (bits) |
|---|---|
| MessageID | 8 |
| ConfigurationChange | 2 |
| QuickPageIndicatorCountMinusOne | 6 |
| QuickPageIndicatorCountMinusOne + 1 occurrences of the following field: | |
| QuickPageIndicator1 | 1 |
| QuickPageIndicatorCountMinusOne + 1 occurrences of the following field: | |
| QuickPageIndicator2 | 1 |
| QuickPageIndicatorCountMinusOne + 1 occurrences of the following field: | |
| QuickPageIndicator3 | 1 |
| QuickPageIndicatorCountMinusOne + 1 occurrences of the following field: | |
| QuickPageIndicator4 | 1 |
| Reserved | 0-7 (as needed) |

MessageID The access network shall set this field to 0x03.
Configuration Change

If the Redirect public data of the Overhead Message Protocol is '1', then the access network shall set this field to '11'. Otherwise, the access network shall set this field as follows:

Every time an OverheadMessages.ConfigurationChanged indication is received, the access network shall set this field in subsequent QuickPage messages to one more(modulo '11') than the last value of this field before the indication was received and when the Redirect public data of the Overhead Message Protocol was '0'.
QuickPageIndicatorCountMinusOne The access network shall set this field to one less than the number of occurrences of the QuickPageIndicator1 field in this message.
QuickPageIndicator1

The access network shall set the Xth occurrence of this field to '1' if the synchronous or sub-synchronous capsule that follows the quick synchronous capsule in which this message is sent carries a unicast message directed to the access terminal. X is the result of applying the hash function (see 14.4) using the following parameters:
Key=SessionSeed, which is provided as public data of the Address Management Protocol,
N=1+QuickPageIndicatorCountMinusOne, and
Decorrelate=0xa241.
QuickPageIndicator2

The access network shall set the Xth occurrence of this field to '1' if the synchronous or sub-synchronous capsule that follows the quick synchronous capsule in which this message is sent carries a unicast message directed to the access terminal. X is the result of applying the hash function (see 14.4) using the following parameters:
Key=SessionSeed, which is provided as public data of the Address Management Protocol,
N=1+QuickPageIndicatorCountMinusOne, and
Decorrelate=2×SessionSeed[11:0].
QuickPageIndicator3

The access network shall set the Xth occurrence of this field to '1' if the synchronous or sub-synchronous capsule that follows the quick synchronous capsule in which this message is sent carries a unicast message directed to the access terminal. X is the result of applying the hash function (see 14.4) using the following parameters:
Key=SessionSeed, which is provided as public data of the Address Management Protocol,
N=1+QuickPageIndicatorCountMinusOne, and
Decorrelate=6×SessionSeed[11:0].
QuickPageIndicator4

The access network shall set the Xth occurrence of this field to '1' if the synchronous or sub-synchronous capsule that follows the quick synchronous capsule in which this message is sent carries a unicast message directed to the access terminal. X is the result of applying the hash function (see 14.4) using the following parameters:
Key=SessionSeed, which is provided as public data of the Address Management Protocol,
N=1+QuickPageIndicatorCountMinusOne, and
Decorrelate=14×SessionSeed[11:0].

Reserved The access network shall add reserved bits to make the length of the entire message equal to an integer number of octets. The access network shall set this field to zero. The access terminal shall ignore this field.

Thereby, through operation of an embodiment of the present invention, an access terminal is able better, and quickly, to determine whether a page is broadcast thereto. If a quick page message, page indication location to which the access terminal hashes fails to include an indication that the access terminal is being paged, the access terminal enters into a reduced power state. The occurrence of false wakeup is less likely to occur due to the multi-hashing to the multiple quick paging indication slots.

What is claimed is:

1. A method performed at an access network for generating a page message to cause access-terminal transition to a sleep state, said method comprising:
setting a first decorrelate value to a first product formed by multiplying two and a portion of a session seed;
setting a second decorrelate value to a second product formed by multiplying a value other than two and a portion of the session seed;
generating a first hash value using said first decorrelate value as a decorrelate value and said session seed as a key; generating a second hash value using said second decorrelate value as a decorrelate value and said session seed as the key; and
populating the page message with a first page indication at a first page indicator location in the page message based on the first hash value and with a second page indication at a second page indicator location in the page message based on the second hash value.

2. The method of claim 1 wherein said setting the second decorrelate value comprises setting the second decorrelate value to six times the portion of said session seed.

3. The method of claim 1 further comprising:
setting a third decorrelate value to a third product formed by multiplying the number fourteen and the portion of said session seed;
generating a third hash value using said third decorrelate value as the decorrelate value; and further populating the page message with a third page indication at a third page indicator location in the page message based on the third hash value.

4. The method of claim 1, wherein said session seed is provided as public data shared by the network terminal and an access terminal.

5. An apparatus for generating a page message comprising:
a hash generator configured to generate a first hash value using a first decorrelate value formed of a first product of two and a portion of a session seed and a second hash value using a second decorrelate value formed of a second product of a value other than two and a portion of the session seed; and
a page indication populator adapted to populate the page message with a first page indication at a first page indicator location in the page message based on the first hash value and a second page indication at a second page indicator location in the page message based on the second hash value.

6. The apparatus of claim 5, wherein, the hash generator is further configured to generate the second hash value using the second decorrelate value formed of the second product of the number six and the portion of the session seed.

7. The apparatus of claim 6, wherein,
the hash generator is further configured to generate a third hash value using a third decorrelate value, formed of a third product of fourteen times the portion of the session seed; and
the page indication populator is adapted to populate the page message with a third page indication at a third page indicator location in the page message based on the third hash value.

8. A method performed at an access terminal, comprising:
receiving a page message from an access network, wherein the page message has a plurality of page indications;
setting a first decorrelate value to a first product formed by multiplying two and a portion of a session seed;
setting a second decorrelate value to a second product formed by multiplying a value other than two and a portion of the session seed;
generating a first hash value using said first decorrelate value as a decorrelate value and said session seed as a key;
generating a second hash value using the second decorrelate value as a decorrelate value and said session seed as the key; and
detecting for a first page indication in the page message at a first page indicator location based on the first hash value and for a second page indication in the page message at a second page indicator location based on the second hash value.

9. The method of claim 8 further comprising:
setting the second decorrelate value comprises setting the second decorrelate value to the product of the number six and the portion of said session seed.

10. The method of claim 9 further comprising:
setting a third decorrelate value to a third product formed by multiplying the number fourteen and the portion of said session seed; and
detecting for a third page indication in the page message at a third page indicator location based on the third hash value.

11. The method of claim 10 further comprising:
transitioning to a sleep state if the access terminal entered a Monitor State to receive a quick synchronous capsule and received the page message with the first page indication set to '0', the second page indication is set to '0', the third page indication set to '0', or a fourth page indication location set to '0', and a Configuratation-Change field in the page message not set to '11', and the access terminal has determined that a SectorParameters message is up to date.

12. An apparatus at an access terminal, said apparatus for determining paging indicator locations in a page message, said apparatus comprising:
a hash value generator configured to generate a first hash value using a first decorrelate value and a key, wherein the first decorrelate value is the product of two and a portion of a session seed, and the key is said session seed and configured to generate a second hash value using a second decorrelate value and a key, wherein the second decorrelate value is the product of a number other than two and a portion of the session seed; and
a detector configured to detect for a first page indication in the page message at a first page indicator location determined by the first hash value and configured to detect for the second page indication in the page message at a second page indicator location determined by the second hash value.

13. The apparatus of claim 12, wherein the second decorrelate value is the product of the number six and the portion of the session seed.

14. The apparatus of claim 12, wherein
the hash value generator is further configured to generate a third hash value using a third decorrelate value, wherein the third decorrelate value is the product of the number fourteen and the portion of the session seed; and
wherein said detector is further configured to detect for a third page indication in the page message at a third page indicator location determined by the third hash value.

* * * * *